United States Patent [19]
Lecuyer et al.

[11] Patent Number: 5,424,872
[45] Date of Patent: Jun. 13, 1995

[54] RETROFIT LINE OF SIGHT STABILIZATION APPARATUS AND METHOD

[75] Inventors: John Lecuyer, Crystal Lake; James P. Quinn, Gurnee, both of Ill.

[73] Assignee: Recon/Optical, Inc., Barrington, Ill.

[21] Appl. No.: 224,761

[22] Filed: Apr. 8, 1994

[51] Int. Cl.[6] .................................................. G02B 7/02
[52] U.S. Cl. ................................. 359/811; 359/824; 359/556
[58] Field of Search ............... 359/811, 554, 555, 556, 359/557, 894, 696, 823, 824, 554–557, 811, 823, 824, 894, 696

[56] References Cited

U.S. PATENT DOCUMENTS

| | | | |
|---|---|---|---|
| 3,468,596 | 9/1969 | Alvarez | 359/557 |
| 3,944,324 | 3/1976 | Tajima et al. | 359/555 |
| 3,953,106 | 4/1976 | Furukawa et al. | 359/557 |
| 4,013,339 | 3/1977 | Ando et al. | 359/556 |
| 4,131,333 | 12/1978 | Humphrey | 359/555 |
| 4,316,649 | 2/1982 | Alvarez et al. | 359/556 |
| 4,417,788 | 11/1983 | Alvarez et al. | 359/556 |
| 4,615,590 | 10/1986 | Alvarez et al. | 359/556 |
| 4,650,292 | 3/1987 | Baker et al. | 359/720 |
| 4,844,602 | 7/1989 | Kitagishi et al. | 359/557 |
| 4,911,541 | 3/1990 | Alvarez et al. | 359/557 |
| 5,078,472 | 1/1992 | Suguwara | 359/824 |
| 5,122,908 | 6/1992 | Sporer | 359/557 |
| 5,148,313 | 9/1992 | Schwemin | 359/555 |

Primary Examiner—Paul M. Dzierzynski
Assistant Examiner—Suma N. Ramaswamy
Attorney, Agent, or Firm—Allegretti & Witcoff, Ltd.

[57] ABSTRACT

Apparatus and methods for stabilizing a line of sight of an optical system without the use of gimbals. The apparatus includes a fixed plano-concave lens element mounted in a frame and a moveable plano-convex lens element mounted in a carriage. The frame mounts onto a preexisting optical system such that the lens elements are nominally aligned with the line of sight of the preexisting optical system. A motor driving unit is provided in the frame which moves the plano-convex lens element back and forth relative to the fixed plano-concave lens element about two orthogonal movement axes in response to small amplitude disturbances imparted to the optical system. The line of sight stabilization apparatus is suitable for retrofit installation onto preexisting optical systems, and in particular, to missile tracking guidance and sighting systems which were originally manufactured or installed without line of sight stabilization capability.

32 Claims, 8 Drawing Sheets

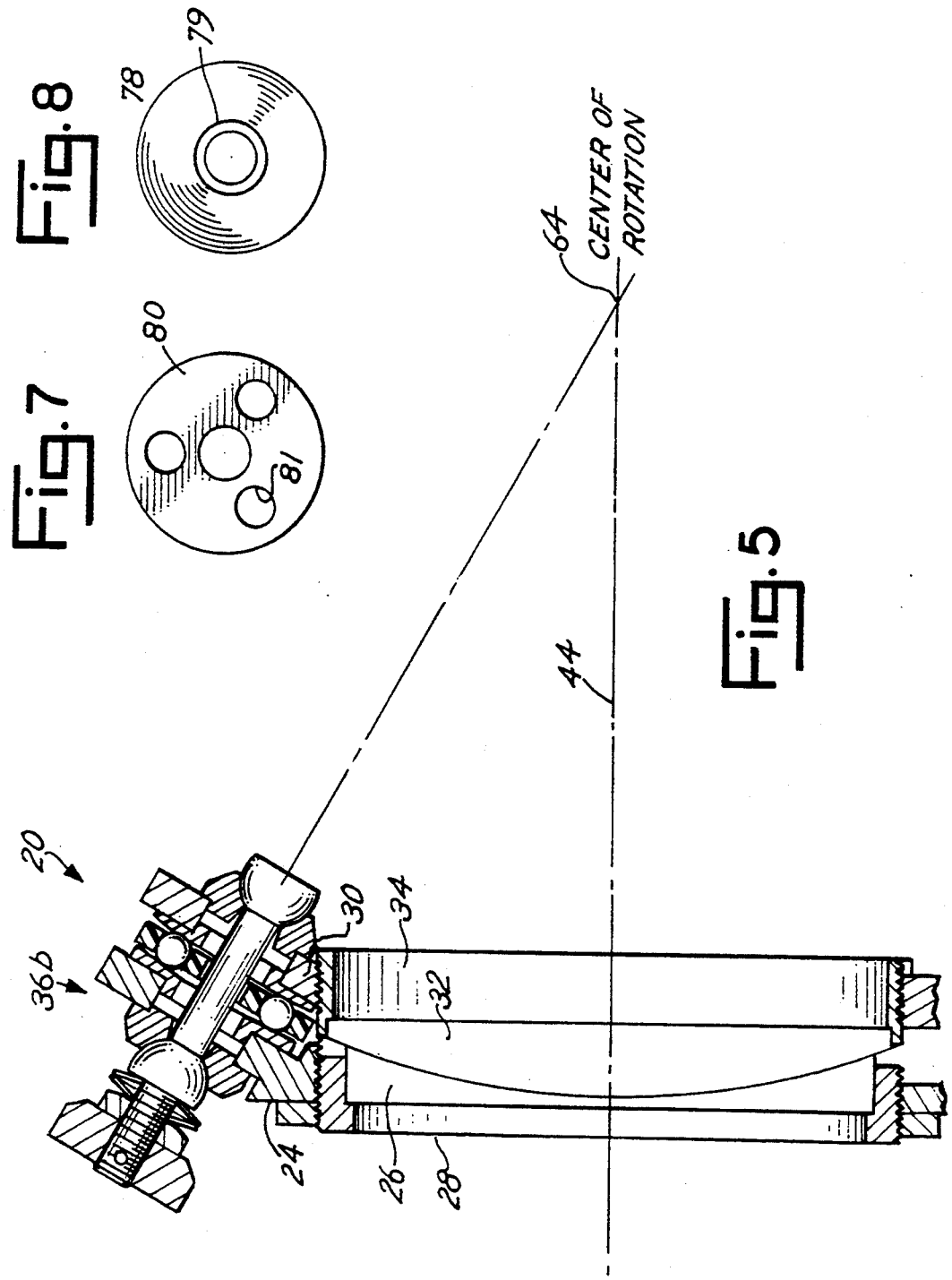

RETROFIT LINE OF SIGHT STABILIZATION APPARATUS AND METHOD

BACKGROUND OF THE INVENTION

A. Field of the Invention

This invention relates to the field of line of sight stabilization for optical systems. More particularly, the invention relates to a stabilization system in which complementary plano-concave and plano-convex lens elements are moved relative to one another to correct for small amplitude accelerations, thereby causing light passing though the lens elements to refract and maintain alignment with the line of sight of the optical system.

B. Description of Related Art

Line of sight stabilization involves the maintenance of the line of sight (or optical axis of an optical system) in a steady orientation during periods in which the optical system is subject to disturbances, such as random, small amplitude jitter or accelerations. Systems for performing line of sight stabilization can take many forms. In one widely used form, the stabilized optical instrument is mounted on a platform, and the platform itself is stabilized using gyroscopes, internal rate sensors, or linear accelerometers. One implementation of this technique is disclosed in the Algrain patent, U.S. Pat. No. 5,124,938, assigned to the assignee of the present invention. In the Algrain patent, a gyroless stabilization system is provided in which a camera or other sensor is mounted to a platform in a vehicle. The line of sight of the sensor is stabilized about the center of rotation of the vehicle by moving gimbals to counteract accelerations about the center of rotation.

Another technique for image stabilization is to provide a complex arrangement of lenses and mirrors, and electronic circuitry for positioning the mirrors to stabilize the image. Several patents discussing this technique are U.S. Pat. Nos. 4,417,788 and 3,468,596, both issued to Alvarez.

Another technique for stabilizing the line of sight of a camera or other sensor takes advantage of the so-called "wedge effect". As shown in FIG. 1A, when a plano-concave lens 10 and a plano-convex lens 12 are placed in close proximity to one another such that the planar surfaces of the lens elements 10 and 12 are parallel, light rays passing through the lenses are not refracted from their original path. The illustration of FIG. 1A shows light passing from left to right, but the effect is the same for light passing through the lenses from right to left. Referring to FIG. 1B, if one of the lenses is rotated relative to the other, here, the plano-convex lens is rotated relative to the plano-concave lens, the parallel surfaces of the lens elements are no longer parallel and light is refracted through an angle $\alpha$. The angle formed by the non-parallel sides of the lens elements is known as the wedge angle W. The angle of refraction $\alpha$ is related to the wedge angle W by the relationship:

$$\alpha = 2W$$

In the above discussion of FIG. 1B, the plano-concave lens element 10 is said to be "fixed" relative to the plano-convex lens element 12, because, in the example and in use, the plano-concave element 10 remains stationary while the plano-convex lens 12 is rotated in a spherical manner relative to the plano-concave lens 10. In the inertial frame of reference, the plano-convex lens element is fixed. The same refraction angle $\alpha$ and relationship between $\alpha$ and W occurs when the positions of the plano-concave lens 10 and plano-convex lens 12 are interchanged, or when the stabilized optical system emits photons rather than collects photons, as would be the case for a stabilized range finder or designator.

The wedge effect illustrated in FIGS. 1A and 1B has been used in prior art stabilization systems. FIG. 2 illustrates the system shown in U.S. Pat. No. 4,911,541 in a greatly simplified form. The outer plano-concave element 10 is fixed relative to the housing (not shown) of the optical system to be stabilized. The line LOS represents the line of sight of the optical system. The plano-convex element 12 is mounted to a set of gimbals 14, 16. The plano-convex 12 element is inertially stabilized by movement of the gimbals 14, 16. The gimbals 14, 16 rotate the plano-convex lens 12 relative to the plano-concave lens 14 when jitter and other small amplitude accelerations are detected. The wedge angle created by the rotation of the movable lens 12 relative to the fixed lens 10 refracts light passing though the lenses. By controlling the amount of movement of the gimbals, the refraction angle is also controlled. Ideally, the refraction angle is controlled such that the line of sight of the optical system is stabilized. Other patents disclosing the technique of FIG. 2, or a variant thereof, are U.S. Pat. Nos. 5,122,908 and 4,013,339. Other patents relating to image stabilization systems are U.S. Pat. Nos. 5,148,313, and 4,013,339.

A significant inherent limitation of the prior art system of FIG. 2 is that the gimbals 14, 16 and lenses 10, 12 are incorporated, along with the camera or other sensor, into an integrated and unitary sensor and stabilization structure. In particular, the gimbal and lens design of FIG. 2 is not readily susceptible to installation onto existing optical systems that do not have line of sight stabilization systems already built in. The present invention, however, permits a line of sight stabilization system to be fitted onto preexisting optical systems. Heretofore, such a result was highly impractical or impossible.

The application of line of sight stabilization capability onto preexisting optical system has tangible benefits. Frequently, cameras and other optical devices do not have line of sight stabilization compatibility as part of the original equipment specifications. This is often the case with military sighting and tracking systems. By virtue of the installation of line of sight stabilization capability on the existing optical system, the performance of the optical system is improved, because jitter and other unwanted small amplitude oscillations are removed.

Accordingly, it is an object of the invention to provide a line of sight stabilization system which is capable of installation onto a preexisting optical system.

Another object of the invention is to provide a line of sight stabilization system in which the line of sight stabilization system is compact in size.

An additional object of the invention is to provide a robust and rugged line of sight stabilization system suitable for use in conjunction with military optical systems, such as sighting and viewing devices, designating systems, rangefinding systems, and reconnaissance systems, and particularly optical systems used in ground combat.

SUMMARY OF THE INVENTION

The foregoing advantages, objects and features of the invention are achieved by a stabilizing apparatus for stabilizing a line of sight of a sensing device. The stabilizing apparatus includes a fixed first optical element and a frame carrying the first optical element. The frame mounts onto the preexisting optical system which is in need of line of sight stabilization capability. A second optical element complementary to the first optical element (e.g., if the first optical element is plano-concave, the second optical element is plano-convex), is also provided. The second optical element is mounted in a carriage directly behind the first optical element such that the first and second optical elements are nominally aligned, with their optical axis coincident with the line of sight axis of the optical system.

At least two bearing assemblies securely retain the carriage and the frame in close spaced relation to one another. Each of the bearing assemblies has a first end connected to the frame and a second end connected to the carriage. The bearing assemblies permit the second optical element to move in a spherical manner relative to the first optical element about a center of rotation. A motor system precisely moves the carriage and thus the second optical element relative to the first optical element in response to small amplitude accelerations imparted to the optical system. The controlled movement of the second optical element causes light passing through the first and second optical elements to refract according to the wedge effect, to thereby stabilize the line of sight.

The electronics unit for the motor calculates movement commands for the motors based on information concerning the separation distance from a fixed point in the frame and a fixed point in the carriage, and inertial rate of rotation signals measured by inertial rate sensors, such as quartz rate sensors. Alternatively, inertial acceleration signals measured by accelerometers may be used instead of inertial rate sensors. In either case, the measurement of inertial rate or acceleration is preferably, but not necessarily made in the plane of the moveable lens element.

BRIEF DESCRIPTION OF THE DRAWINGS

In the specification, presently preferred forms of the invention are described in conjunction with the appended drawings, wherein like reference numerals refer to like elements in the various views, and wherein:

FIG. 5 is a cross-sectional view of the stabilization system of FIGS. 3 and 4 along the line 5—5 of FIG. 4.

FIG. 7 is a plan view of the bearing retainer of FIG. 6;

FIG. 8 is a plan view of the pad of FIG. 6;

DETAILED DESCRIPTION OF THE PREFERRED EMBODIMENT

Figure 3:
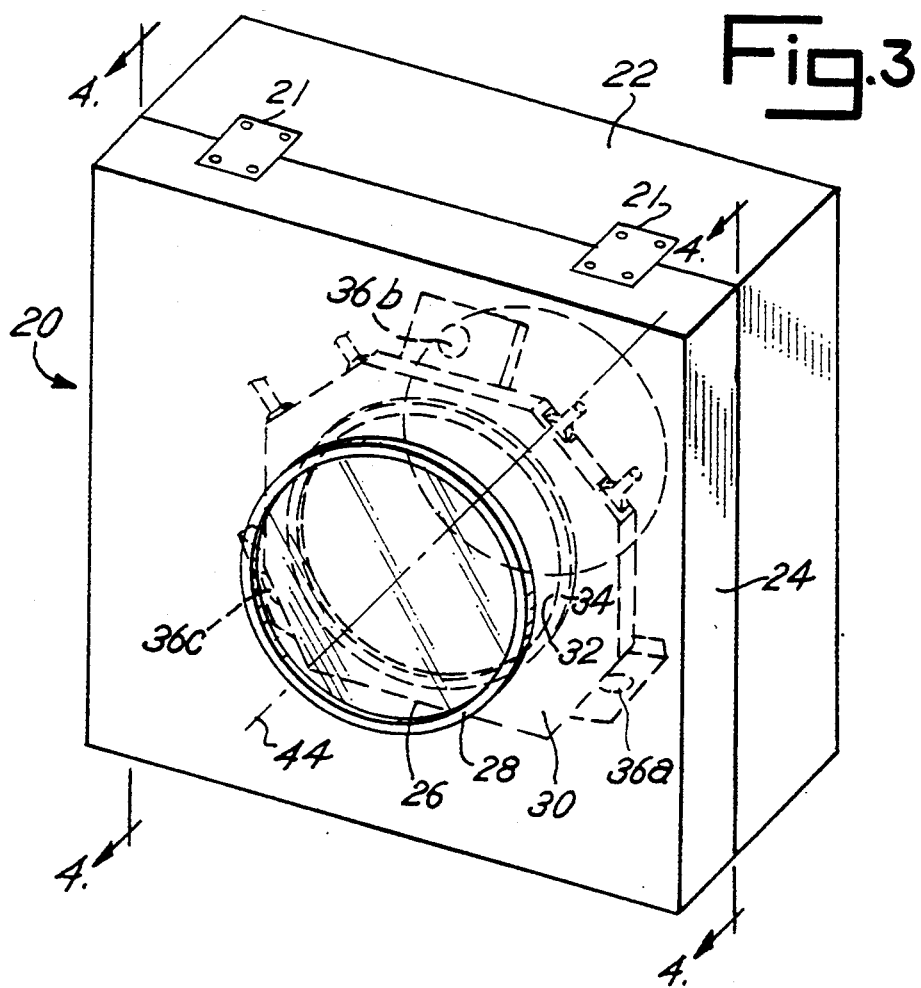
FIG. 3 is a perspective view of a line of sight stabilization system according to the present invention, which is retrofitted onto a preexisting optical system.

Referring now to FIGS. 3–5 and 13, the stabilizing apparatus 20 of the present invention is shown in conjunction with a preexisting optical system 22 in FIG. 3. The stabilizing apparatus 20 comprises a frame (also referred to as a "stage") 24 which carries the fixed, plano-concave lens element 26. The lens 26 is mounted on a lens retaining element 28 which is threaded into the frame 24. The stabilizing apparatus 20 further includes a carriage 30 mounted behind the frame 24 which carries a second complementary optical element 32. Optical element 32 is a plano-convex lens. The plano-convex lens 32 is also mounted in a lens retaining element 34, which is threaded into the carriage 30.

The stabilizing apparatus 20 is further provided with three bearing assemblies 36A, 36B, 36C, which securely retain the carriage 30 and the frame 24 in close spaced relationship to one another. Each of the bearing assemblies 36A–C have a first end fixed to the frame 24 and a second end fixed to the carriage 30. The frame 24 is fixedly mounted to the preexisting optical system 22 in any suitable fashion (such as by brackets 21 or mounting bolts) such that the line of sight 44 of the sensor or other optical component of the optical system 22 is nominally aligned with the optical axes of the plano-concave and plano-convex lens elements 26, 32, respectively, of the stabilizing apparatus 20.

The optical system 22 in the example discussed herein is an optical guidance and tracking system for a missile launching system, and in particular a TOW antitank missile system. However, it will be readily understood that the line of sight stabilization techniques disclosed herein are applicable to other types of optical systems used in other fields of endeavor. One of the principal advantages and features of the present invention is that the stabilizing apparatus 20 is a compact, self-contained unit which is capable of being installed onto preexisting optical systems. The type of optical system, whether a range finder, camera, sighting system, tracking system, etc., is essentially unimportant. Examples of preexisting optical devices which may need to have a line of sight stabilization system retrofitted on to the devices are cameras, rangefinding systems, telescopes, sighting systems, viewing systems and designators. Those of ordinary skill in the art will appreciate that with suitable modifications to the dimensions of the components described herein (if necessary), and to the mounting hardware, the inventive line of sight stabilization apparatus and method may be installed onto these other devices.

Figure 4:
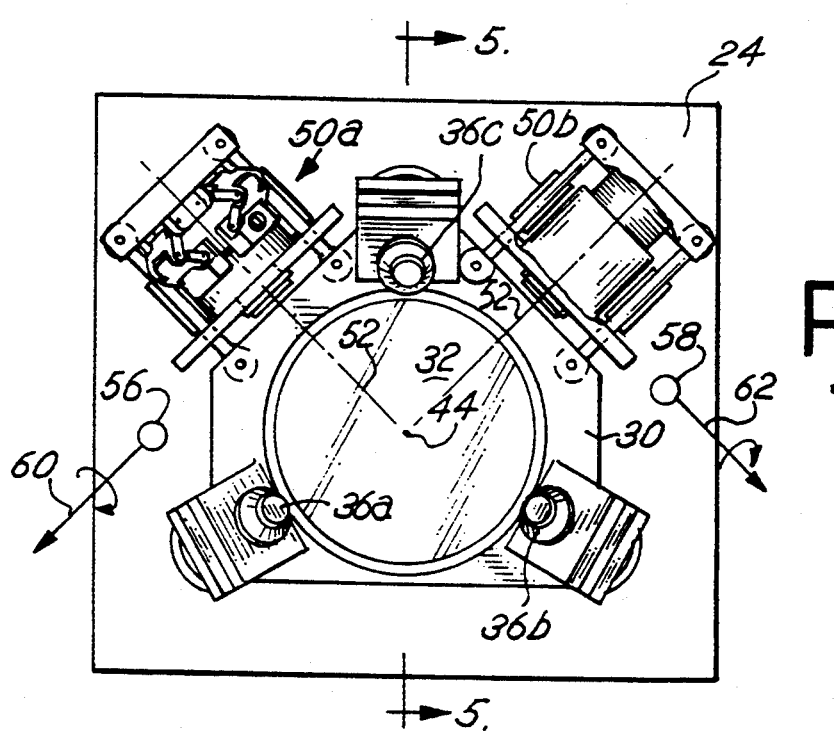
FIG. 4 is a plan view of the stabilization system of FIG. 3, as seen in the direction 4—4 of FIG. 3.

Referring now to FIG. 4, the stabilizing apparatus 20 of FIG. 3 is shown in plan view in the direction of the arrows 4—4 of FIG. 3. It will be noted that the dimensions and shape of the peripheral portion of the frame 24 is not particularly important, as the principal requirement is that the frame is dimensioned to adapt and fit onto a preexisting optical system 22. Any suitable mounting arrangement, for example, brackets and or mounting bolts, are used to mount the stabilization unit 20 to the optical system 22. A second requirement is that the frame 24 has to securely hold the lens element 26. In FIG. 4, it will be seen that the carriage 30 is mounted to the frame 24 by means of bearing assemblies 36A, 36B, 36C, which are arranged at 120° angles to one another relative to the line of sight axis 44.

Figure 13:
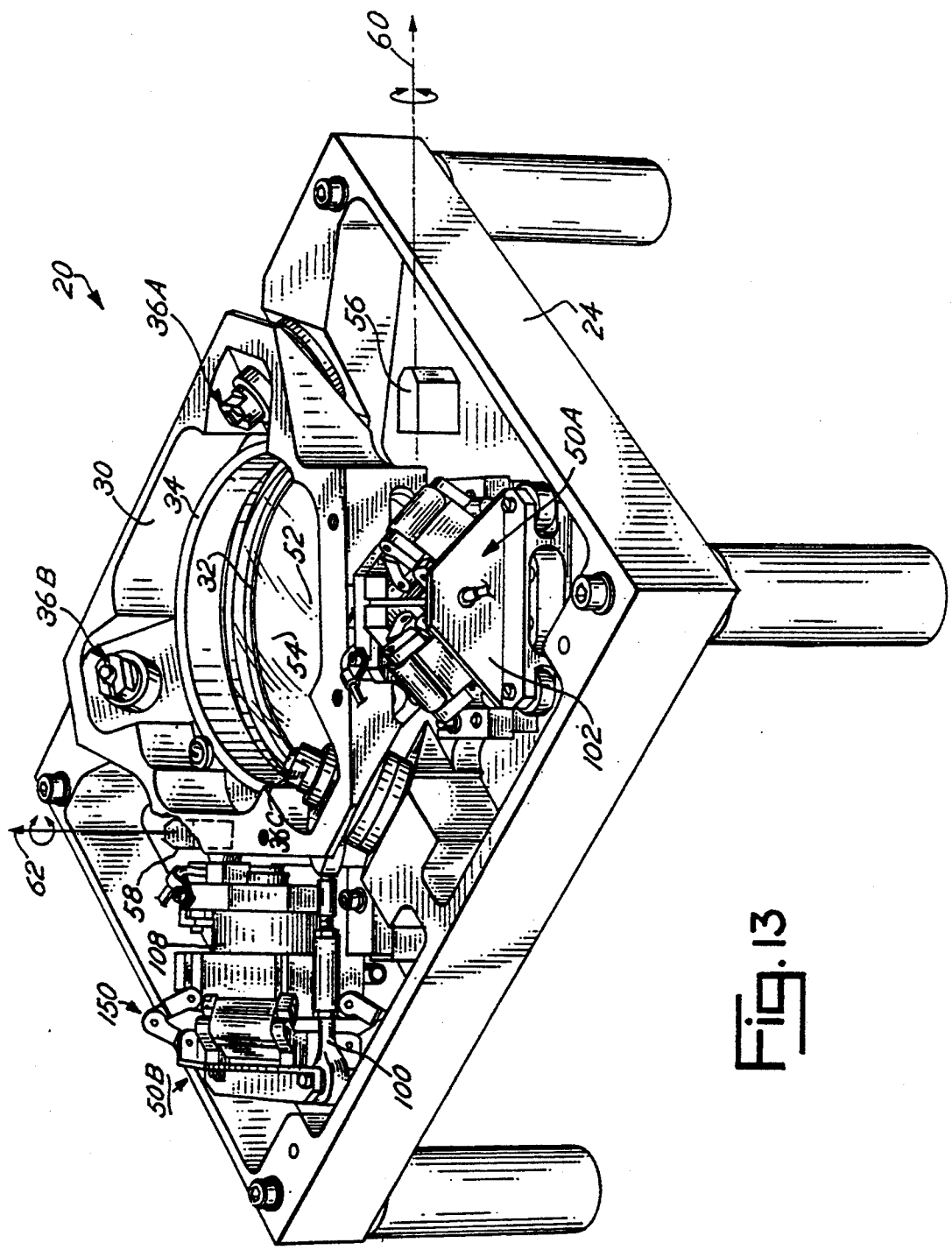
FIG. 13 is a perspective view of the stabilization system of FIGS. 3 and 4.

A pair of linear magnetic actuators or motors 50A and 50B provide a driving means for moving the carriage 30 (and thus the plano-convex lens 32) back and forth relative to the fixed plano-concave element 26 in response to small amplitude accelerations. The motors (or linear magnetic actuators 50) are described in more detail below in conjunction with FIGS. 9A–9C. As seen in FIGS. 4 and 13, The motor 50A drives the carriage 30 back and forth along a first movement axis 52. Motor 50B drives the carriage 30 back and forth along a second movement axis 54. Movement axis 52 is perpendicular to movement axis 54. It will be understood that when motor 50A moves the carriage and lens along axis 52, the lens 32 is rotated about a lens rotation axis that is orthogonal to axis 52 and which passes through the center of rotation 64 (FIG. 5). Similarly, when motor 50B moves the carriage 30 and lens 32 along movement axis 54, the lens is rotated about a second rotation axis orthogonal to axis 54 and which also passes through the center of rotation 64. The scale factor for the embodiment of FIGS. 4 and 13 is one degree of rotation per one-tenth inch of actuator travel. The line of sight movement is one-half the carriage movement angle. The side acting mechanical movement is sufficiently linear (with 40 microradians of total error over one degree of total lens axis movement) to not warrant any tangential actuation. The motors 50A and 50B when working in tandem are thus capable of moving the carriage 30 and lens 32 in two degrees of freedom about the two orthogonal movement axes 52 and 54 (or, equivalently, the two lens rotation axes passing through the center of rotation).

Inertial rate sensors, preferably comprising quartz rate sensors 56 and 58, are mounted on the interior surface of the frame 24, and are used in the generation of control signals for moving the motors 50A and 50B back and forth to stabilize the line of sight axis. Quartz rate sensor 56 has an axis of sensitivity 60 about which the sensor 56 measures inertial rotations in the plane of the lens 32. The axis of sensitivity 60 is preferably aligned in parallel with the lens rotation axis that arises from the movement of the lens 32 by motor 50A back and forth along movement axis 52. Motor 50A, in effect, compensates for the component of inertial rotation about the axis 60. Quartz rate sensor 58 has an axis of sensitivity 62 in the plane of the lens about which the sensor 58 measures inertial rotations. The axis of sensitivity 62 is preferably aligned in parallel with the lens rotation axis that arises from the movement of the lens 32 by motor 50B back and forth along movement axis 54. The quartz rate sensors 56 and 60 can be mounted in other orientations, provided that their axes of sensitivities are orthogonal to each other, and provided that their output signal is multiplied by an appropriate scale factor, such as the cosine of the angle between the axes of sensitivity of the sensors and the respective rotational axis of the lens 32. The inertial rate sensors 56 and 58 are shown mounted in the plane of the lens 32, but the mounting of the inertial rate sensors are not constrained to be mounted in the plane of the lens 32. Since the inertial rate sensors measure the motion of the frame 24, they can be mounted at other locations, and a mapping, using geometric principles, is used to derive the rotations in the plane of the lens 32. A preferred quartz rate sensor is manufactured by Systron Donner, part no. QRS11-00100-100. However, other types of inertial rate sensors may be used, such as gyroscopes.

As an alternative to inertial rate sensors, linear or angular accelerometers may be mounted to the frame and used to generate angular acceleration information in the plane of the lens 32. For example, four pairs of linear accelerometers are mounted in the plane of the plano-convex lens element 32 and oriented such that they measure accelerations in a direction parallel to the line of sight axis 44 along two orthogonal axes. The linear accelerometer output are used to calculate angular acceleration in a well known manner, such as that disclosed in the patent to Algrain, U.S. Pat. No. 5,124,938. Likewise, the accelerometers are not constrained to be mounted in the plane of the lens 32, and a mapping or scale factors are used to derive the acceleration in the plane of the lens element 32.

Figure 1A:
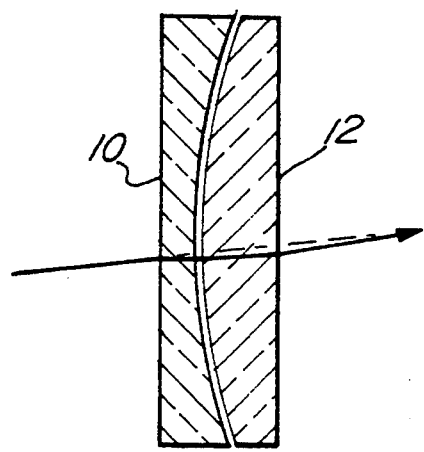
FIG. 1A is a cross-sectional view of complementary lens elements showing a path of light passing through the lens elements without refraction and FIG. 1B is a cross-sectional view of the lens elements of FIG. 1A, with the plano-convex lens element rotated relative to the fixed plano-concave lens element to create the wedge effect.
Figure 1B:
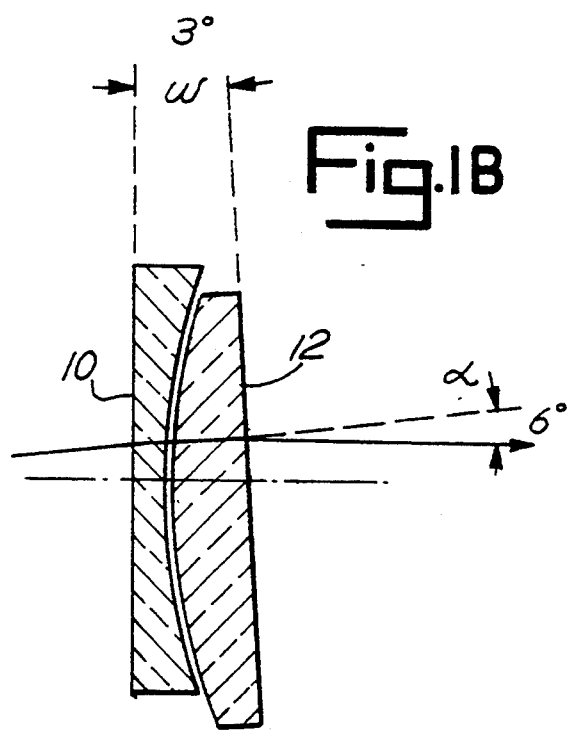
Figure 2:
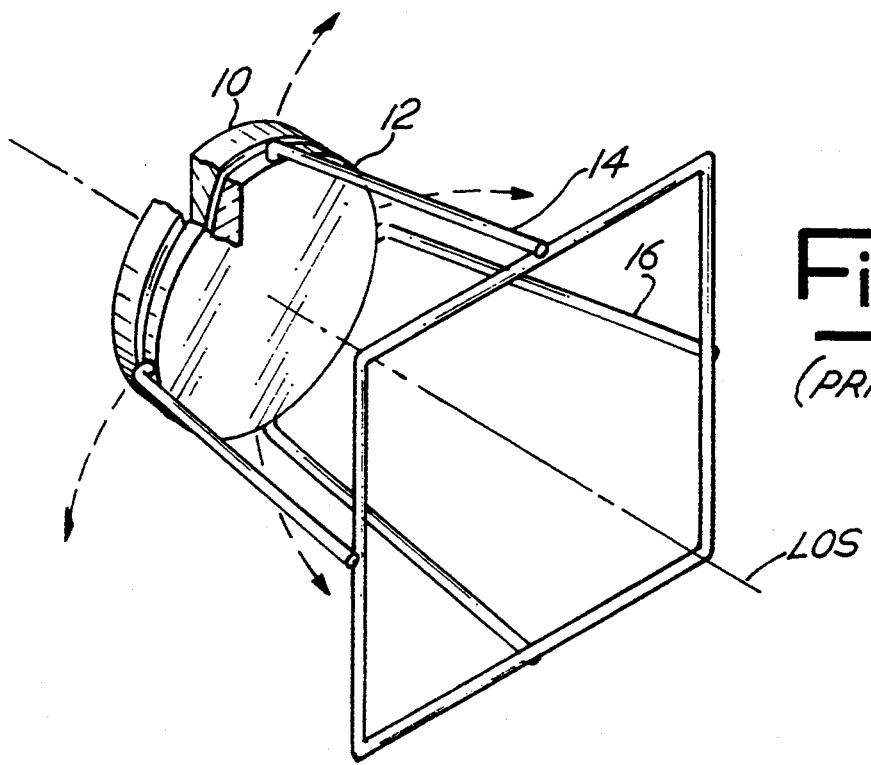
FIG. 2 is a simplified perspective view of a prior art gimbal and lens system for stabilizing a line of sight axis.

Referring now to FIG. 5, the stabilizing apparatus 20 of FIGS. 3 and 4 is shown in a cross-sectional view along the line 5—5 of FIG. 4. The bearing assembly 36B, in cooperation with the other bearing assemblies 36A and 36C, securely retains the carriage 30 in a closed spaced relationship to frame 24. The lens retaining element 34 threads into carriage 30. After the frame 24 is mounted to the carriage 30, and the bearing assembly 36B is secured in place, the lens retaining element 28 with the plano-concave element 26 is threaded into the frame 24 until the lenses 26 and 32 are separated by the minimum practical separation distance. The bearing assemblies 36 are constructed in such a way that, although the carriage and frame are securely maintained in close spaced relationship to one another, the lens element 32 is permitted to rotate in a spherical manner relative to lens 26 about a center of rotation 64 due to the action of the motors 50A and 50B. Such rotation is necessary in order to create the wedge effect as shown in FIG. 1B and achieve stabilization of the line of sight 44. The lenses 26 and 32 are shown in FIG. 5 in their nominally aligned position such that the line of sight axis 44 of the optical system 22 coincides with the optical axis of the lens elements 26, 32.

In FIG. 4, there are shown three different bearing assemblies 36A, 36B and 36C. Generally, at least two such bearing assemblies are needed in order to securely and movably mount the lens element 32 relative to the fixed lens element 26, and preferably, three such bearing assemblies are provided. However, for particular applications, an even greater number of bearing assemblies, perhaps 4 or 5 could even be provided. However, three bearing assemblies should be suitable for most purposes.

Figure 6:
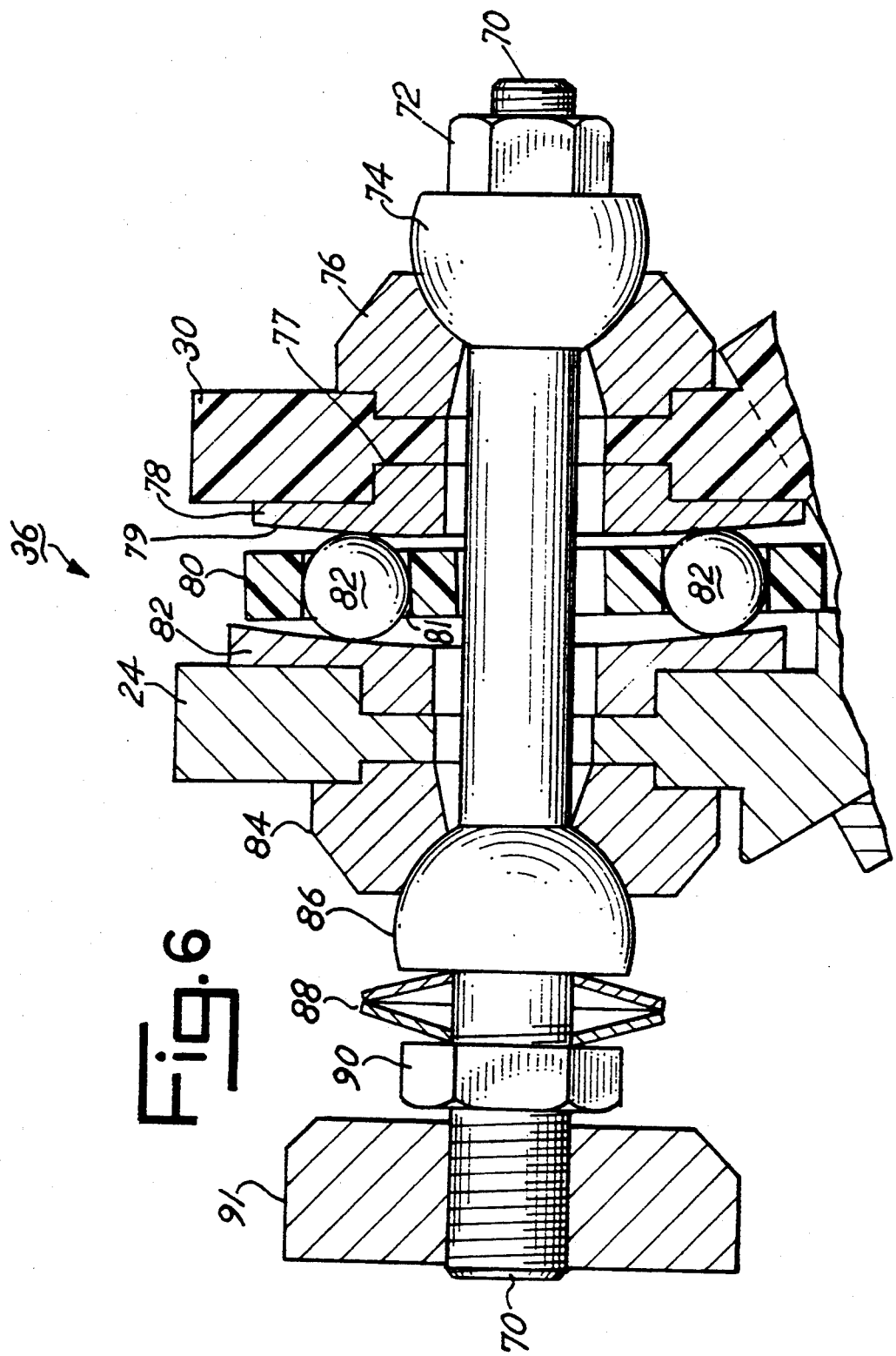
FIG. 6 is a detailed, cross-sectional view of the bearing assembly of FIG. 5 which retains the frame and carriage in closed spaced relation relative to one another.

A representative bearing assembly 36 of FIGS. 3-5 is shown in greater detail in FIG. 6. The bearing assembly 36 comprises a stem 70 which acts as a ligament linking the carriage 30 and frame 24 together. The stem 70 is a threaded shaft which has a nut 72 which threads onto the end of the stem 70 and is used for tension adjustment between the frame 24 and carriage 30. The assembly 36 further has a spherical pivot ball 74, preferably made from a hardened steel material such as Hastaloy TM, which sits in a female housing 76. Housing 76 is preferably made from brass. A grease lubricant (not shown) is applied to the spherical pivot 74 to reduce friction between pivot 74 and female housing 76. The female housing 76 is attached in any convenient manner to the surface of the carriage 30. The carriage 30 has a hard stainless steel pad 78 which acts as a bearing surface for the ball bearings 82. The pad 78 is preferably constructed of a very hard stainless steel, preferably 17-4 PH stainless steel. The pad 78 is adhered or fixed to the carriage 30 by any convenient means. The bearings 82 are retained within the space between the carriage 30 and the frame 24 by means of a bearing retaining disk 80. The disk 80 is a flat plastic disk with three cut-outs 81, shown in FIG. 7, which accommodate the bearings 82.

The frame 24 has a pad 82 with similar properties to pad 78 which acts as a rolling and bearing surface for the bearings 82. The pad 82 is also adhered or otherwise fixed to the frame 24 in any convenient fashion. The frame 24 further has a female brass housing 84 which accommodates a spherical pivot 86. A grease or other lubricant is provided between spherical pivot 86 and housing 84. The spherical pivot 86 is also preferably made out of the Hastaloy TM steel material. The assembly 36 further includes a pair of Belleville washer 88 which are a high, uniform-rate spring. A tightening nut 90 compresses the Belleville washer 88. The tension on the Belleville washer is preferably in a range of 25 to 27 lbs in the present example. Such a tension permits the carriage 30 to be moved relative to the frame 24 by means of movement of the bearings 82 relative to the pads 78 and 82. It will be noted however, that the tension on the Belleville washers 88 will also be a function of the operating environment of the stabilizing device. A greater or lesser amount of tension on the Belleville washers may be appropriate depending on the amplitude of the accelerations that are imparted onto the optical system. It will be appreciated that other types of tensioning devices may prove suitable depending on the particular application. Mass balancing weights 91 may be added to the stem 70 in the vicinity of the nut 90 as needed to counteract any tendency of the carriage 30 to sag or fall relative to the frame 24 due to gravitational forces. A very high density material such as depleted uranium may be suitable for the mass balancing weights 91, particularly if space constraints are a concern.

Referring now to FIG. 6 and FIG. 8, the pad 78 of FIG. 6 is shown in a plan view of FIG. 8. It will be noted that the pad 78 has a convex exterior surface 79, and a central hub 77, which is shown in FIG. 8.

Figure 9A:
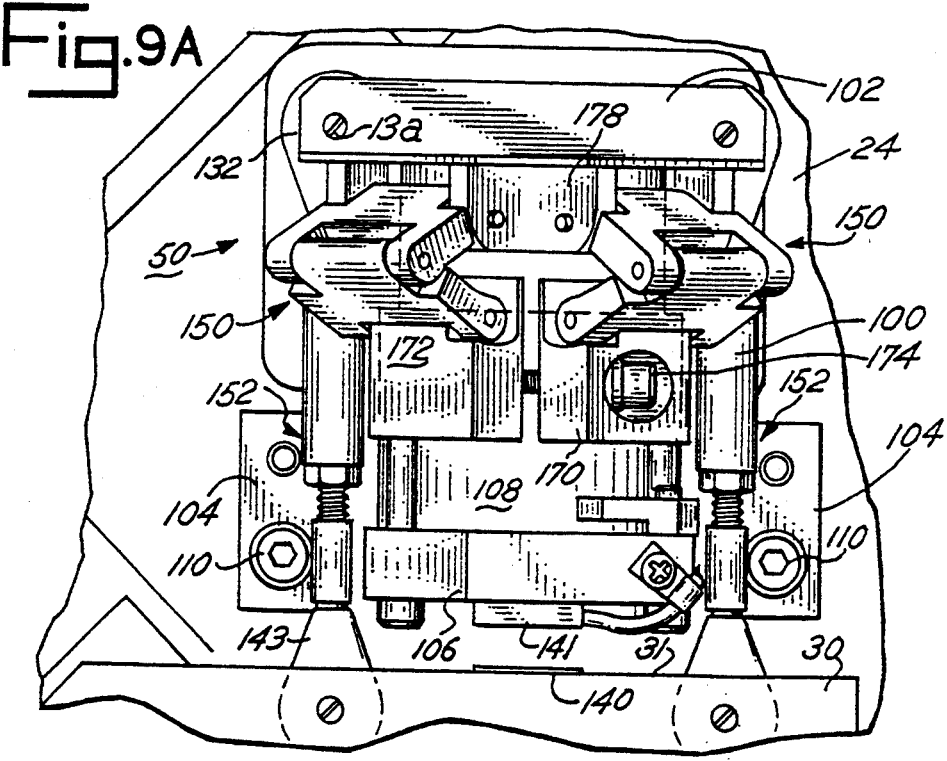
FIG. 9A is a plan view of the linear magnetic actuator assembly of FIG. 4.
Figure 9B:
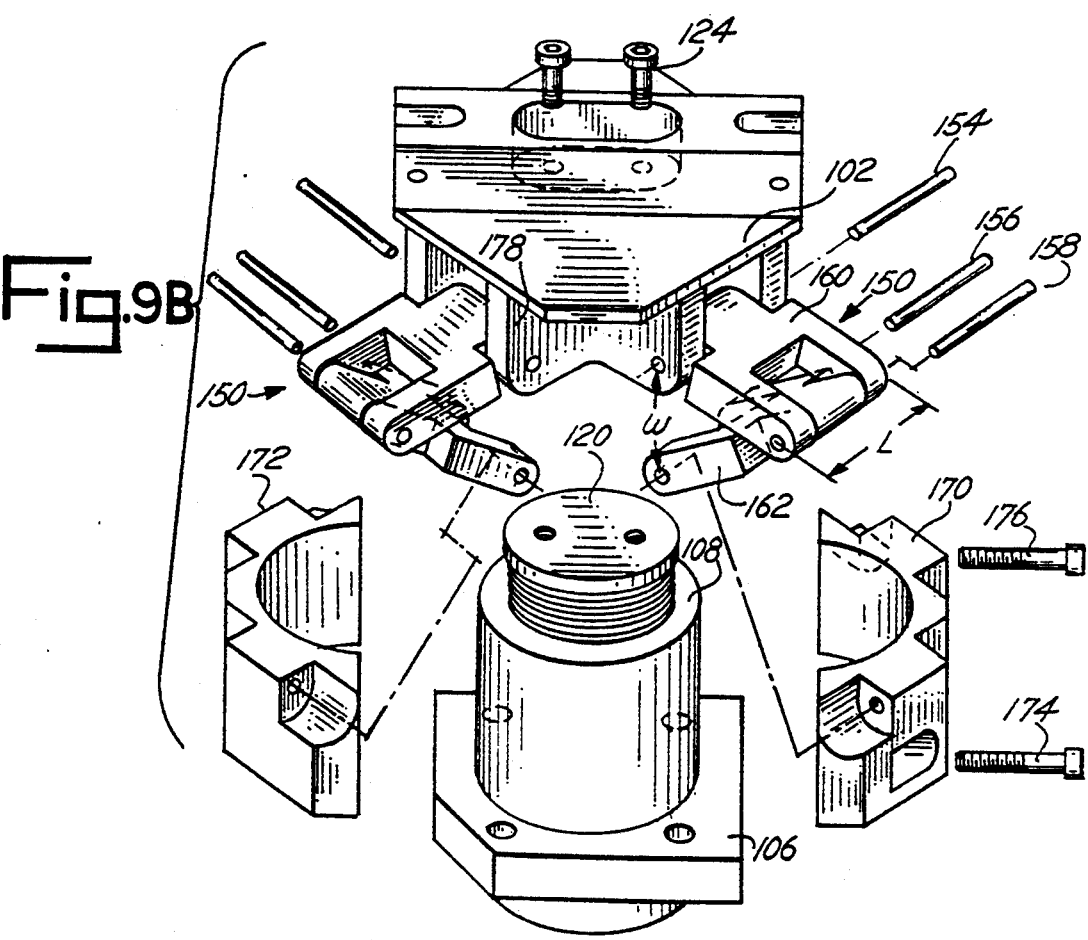
FIG. 9B is an exploded view of a portion of the linear magnetic actuator assembly of FIGS. 4 and 9A, showing the hinge structure in greater detail.
Figure 9C:
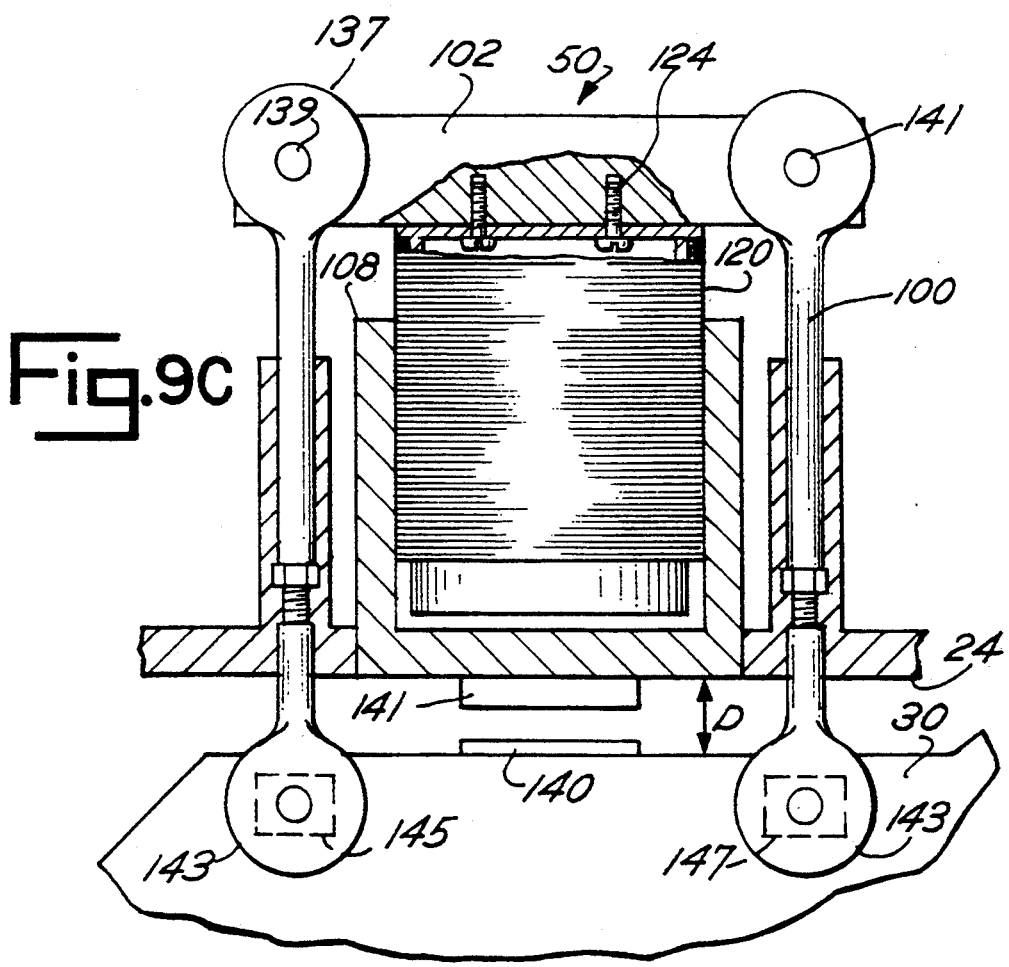
FIG. 9C is a partial cross-sectional view of the linear magnetic actuator assembly of FIGS. 4 and 9A–B with the hinge structure removed to show the coil and magnet structure in greater detail.
Figure 10:
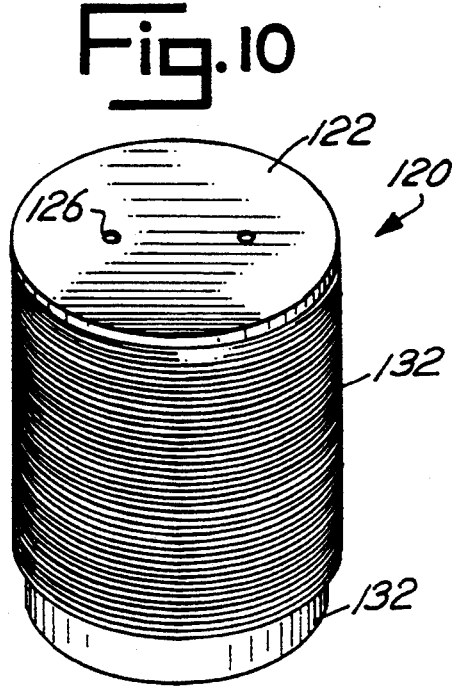
FIG. 10 is an isolated, perspective view of the coil of FIG. 9C.

The motor assembly 50 of FIG. 4 is shown in greater detail in FIGS. 9A-C. FIG. 9A is a plan view of the assembly 50. FIG. 9B is an exploded view of a portion of the assembly 50, and in particular showing two of the hinge structures 150 in greater detail, it being understood that two other hinge structures 150 are mounted to the chassis on the opposite sides of the magnet. FIG. 9C is a partial cross-sectional view of the motor assembly 50 of FIG. 9A with the hinge structure 150 removed to show the coil and magnet structure in greater detail.

As shown in FIGS. 9A-C, the motor assembly 50 is mounted to the frame 24 and has links 100 which extend between an back plate 102 and the housing of the carriage 30. The links 100 have a turnbuckle portion 152 to facilitate the nominal positioning of the links 100 relative to the carriage 30. The link members 100 have a first end 137 secured to the back plate 102 by means of pins 137 and 141. The link members 100 have a second end 143 comprising a Heim joint (a spherical rod end) which fits into recessed regions 145 and 147 provided in the sidewall 31 of the carriage 30 such that the ends 143 can move in a side to side manner. The recessed regions 145 and 147 are designed in sufficient areas and depth to permit the carriage 30 to be moved relative to the second ends 143 of the link members 100 during back and forth movement by the other of the two motor assemblies.

Figure 11:
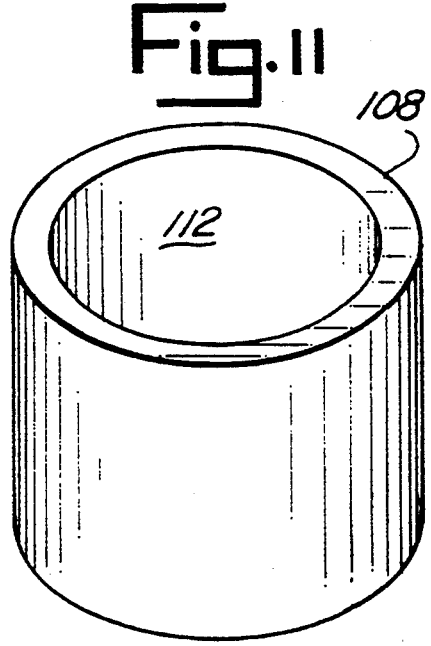
FIG. 11 is an isolated, perspective view of the magnet of FIG. 9C.

The interior surface of the frame 24 has a pair of up-raised ridges 104. A chassis 106 holding a cylindrical magnet 108 is secured to the ridges 104 by means of pins 110. The magnet 108, as shown in an isolated perspective view in FIG. 11, defines a cylinder having an interior recessed region 112. A coil 120 having a bottom portion 122 is disposed within the recessed region 112 of the magnet 108. The bottom portion 122 is mounted to the aluminum backplate 102 by means of screws 124 project through screw holes 126 provided in bottom portion 122. The coil 120 has a copper wire tightly wound around the body 130 of the coil 120. The wire 132 is connected to a current source. When electrical current passes through the copper wires 132 of coil 120, electromagnetic forces are created which tend to pull or push the coil 120 into or out of the magnet 108. By controlling the current flowing through the coil 120, the position of the link members 100 relative to the carriage 30 is thereby controlled, since the link members 100 are fixed to the back plate 102, which is fixed to the coil 120. For example, when current is passed through the coil in such a manner to force the coil 120 out of the magnet 108, the back plate 102 of the motor 50 is pushed away from the carriage 30, and link members 100 pull the carriage 30 towards the frame 24 such that the separation distance D (FIG. 9C) between the carriage 30 and frame 24 is reduced.

Referring in particular to FIG. 9B, axial alignment of the coil and magnet is maintained by at least three, and preferably four hinges 150. The hinges 150 have three pins 154, 156, 158, which define three parallel pivot axes, and are connected by moving elements 160, 162. The moving elements 160, 162 are arranged to provide a very high aspect ratio of length L to width W. In FIG. 9B, it will be seen that the length L is parallel to the axis of rotation of the pivot pins. It is preferred that the hinges be arranged as two opposite pairs of hinges which permit axial motion, that is, motion of the coil 120 into and out of the magnet 180. The hinges 150 prevent tilt or rotation of the coil 120 and magnet 108. The preferred aspect ratio of the hinge is at least about 3 to one or greater, that is the length L should be at least three times greater than the width W. The hinges 150 have braces 170, 172 which clamp the hinge to the magnet 108 by means of screws 174 and 176. The upper moving member 160 is mounted to a top mounting member 178 which is secured to the backplate 102.

Referring to FIG. 9A, a Hall effect sensor and magnet are provided as a means for measuring the relative movement of the carriage 30 and the frame 24, and in particular the separation distance between a fixed point on the carriage 30 and an opposite portion of the frame 24. While there are several possible approaches that may be employed to accomplish this, a high-intensity magnet 140, such as a sumerian-cobalt magnet, shaped as a thin slab, is affixed in any convenient manner to the sidewall 31 of the carriage 30. A Hall effect generator 141 is provided on the bottom surface of the magnet assembly, which generates an electronic signal proportional to strength of the magnetic field generated by the magnet 140. A suitable Hall effect generator 141 is available from Allegro Microsystems, part no. UGN35-03U. The signal from the quartz rate sensors 56, 58 (or accelerometers) and the signals from the Hall effect generator 141 are fed to an electronic control unit which implements the control system shown in FIG. 12. As an alternative to the magnet and Hall effect sensor embodiment, an inductive proximity sensor may be used measuring the movement of the carriage 30 relative to the frame 24. A suitable hall effect sensor is the Kaman model KDM-7200 inductive proximity sensor. A preferred magnet and coil component of the motors 50 is the BEI Motion Systems motor, model No. LA15-1600-1A.

Figure 12:
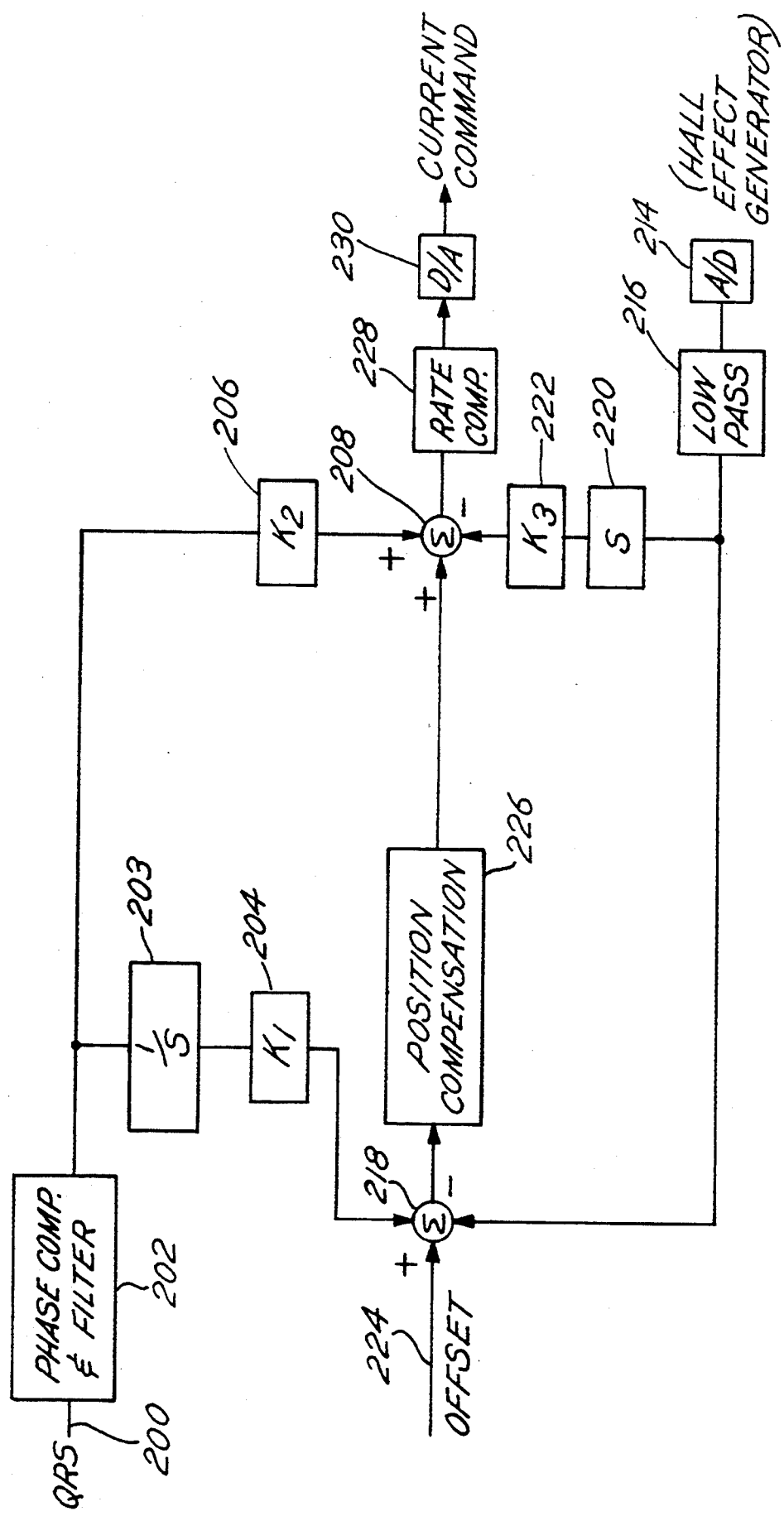
FIG. 12 is a block diagram of the software and electronic circuitry which controls the operation of the linear magnetic actuator of FIGS. 4 and 9A–C.

The software and control electronics for the stabilization apparatus is shown in block diagram form in FIG. 12. The output signals of the quartz rate sensors of FIG. 4 are fed in to the control circuitry at 200. The rate signal is smoothed by a low pass filter and passes through a phase compensation filter 202 to improve the response in the frequency band between 20 and 100 hertz. The signal is passed through integrator 203 and operated on by a scale factor K1 at 204, which is a position loop scale factor in terms of hall generator volts, with units of volts/radian. The resulting signal is fed to summing junction 218. The rate signal, after phase compensation and filtering, is also operated on by scale factor K2 at 206, which is a rate loop scale factor in terms of hall generator volts, in units of volts/-(radians/sec) and passed to summing junction 208.

The signals from the Hall effect generator 141 (FIG. 9A) are converted to digital signals by an analog to digital converter 214 and filtered by a low pass filter 216. The filtered Hall effect signals are fed to summing junction 218, where they are combined with an offset signal 224. The combined signal at junction 218 is processed by a position compensation block 226, which is designed to maintain a steady state or alignment of the lens elements. The resulting signal is fed to summing junction 208, and combined with the rate signal from block 206 and the Hall effect signal, after differentiation at 220 and processing by scale factor K3 at 222. The scale factor K3 is to set the top speed of the movement along the movement axis of the motors 50.

The combined signal at 208 is then subject to rate compensation at 228. Rate compensation loop 228 is a closed speed loop which is designed to provide the right amount of gain and phase adjustment to set the loop bandwidth and phase margin. The compensation also includes notch filters to remove system resonances. In general, the compensation used for both the position loop 226 and the rate loop 228 in proportional-integral. In the preferred embodiment, the bandwidth of the rate loop is between 40 and 60 hertz and the bandwidth of the position loop is between 20 and 30 hertz. The design of the position and rate compensation loops 226 and 228 may be arrived at by employing well-known principles of servo-control theory, of which those of ordinary skill in the art are familiar. A novel, and preferred method of determining the rate and position compensation loops is disclosed in U.S. application Ser. No. 07/917,152, filed Jul. 20, 1992, which is incorporated by reference herein.

After the rate compensation processing at 228, the resulting digital signal is converted to an analog current command signal by digital to analog converter 230 and fed to the current source for the coil 120. The current source sends current though the wire wrapped around the coil to cause the coil 120 to be pushed by electromagnetic forces into and out of the magnet 108, resulting in the movement of the carriage 30 and lens 32 relative to the fixed lens 26.

While presently preferred forms of the invention have been set forth herein, those of ordinary skill in the art will appreciate that various modifications may be made to the structure of the stabilization system without departure from the true spirit and scope of the invention. For example, the term "optical device" can refer to any type of system that has a line of sight to be stabilized, such as one that collects photons, such as a camera or tracking system, or a device that emits photons, such as a designator used in the guidance of smart weapons. As another example, and as noted above, the measurement of accelerations and rotations in the plane of the second lens element 32 is not constrained or limited to the placement of the inertial measurement sensors in the plane of the lens element 32, but rather is intended to include the placement of the sensors at other locations, in which case the output of the sensors can be converted, through suitable mappling or scale factors, to the accelerations or rotations in the plane of the lens element 32. This true spirit and scope is defined by the appended claims, to be interpreted in light of the forgoing specification.

We claim:

1. An optical system comprising, in combination:
   a) an optical device, said optical device having a line of sight;
   b) stabilizing apparatus for stabilizing said line of sight of said optical device, said stabilizing apparatus comprising:
      a first optical element;
      a frame carrying said first optical element;
      a second optical element, said second and first optical elements complimentary to one another;
      a carriage carrying said second optical element and capable of movement in a spherical manner relative to said first optical element;
      two or more bearing assemblies linking and securely retaining said carriage and said frame in close spaced relation to one another such that said first and second optical elements are nominally centered about an optical axis, said bearing assemblies permitting said carriage to be moveable in a spherical manner relative to said frame about said optical axis;
      means for measuring the relative movement between said carriage and said frame; and
      a motor system responsive to said measuring means for moving said second optical element relative to said first optical element in response to small amplitude accelerations, causing light passing through said first and second optical elements to refract and thereby stabilize said line of sight; and c) said stabilizing apparatus mounted to said optical device such that said optical device line of sight and said optical axis defined by said second and first optical elements are nominally aligned.

2. The optical system of claim 1 wherein said optical device comprises a missile tracking and guidance system.

3. The optical system of claim 1 wherein said optical device comprises a telescope.

4. The optical system of claim 1 wherein said optical device comprises a rangefinder.

5. The optical system of claim 1 wherein said optical device comprises a sighting system.

6. The optical system of claim 1 wherein said optical device comprises a designator system.

7. The optical system of claim 1 wherein said optical device comprises a viewing system.

8. The optical system of claim 1 wherein said optical device comprises a camera.

9. The system of claim 1, wherein said motor system of said stabilizing apparatus further comprises means for measuring accelerations in the plane of said second optical element.

10. The system of claim 1, wherein said motor system of said stabilizing apparatus further comprises means for measuring rotations in the plane of said second optical element.

11. Apparatus for stabilizing an optical line of sight of an optical device, comprising:
 a first optical element;
 a frame carrying said first optical element;
 a second optical element, said second and first optical elements complimentary to one another;
 a carriage carrying said second optical element and capable of movement in a spherical manner relative to said first optical element;
 two or more bearing assemblies linking and securely retaining said carriage and said frame in close spaced relation to one another such that said first and second optical elements are nominally centered about an optical axis, said bearing assemblies permitting said carriage to be moveable in a spherical manner relative to said frame about said optical axis;
 means for measuring the relative movement between said carriage and said frame; and
 a motor system responsive to said measuring means for moving said second optical element relative to said first optical element in response to small amplitude accelerations, causing light passing through said first and second optical elements to refract and thereby stabilize said line of sight.

12. The apparatus of claim 1 or claim 9, wherein said motor system comprises:
 a magnet fixed to said frame, said magnet defining a cylindrical interior recess region;
 a coil nested within said interior recess region;
 a current source electrically connected to said coil; and
 a link coupling said coil to said carriage;
 said coil and said link reciprocable relative to said frame, whereby said link moves said carriage relative to said frame when said current flows through said coil.

13. The apparatus of claim 9, wherein said motor system further comprises means for measuring accelerations in the plane of said second optical element.

14. The apparatus of claim 11, wherein said motor system further comprises means for measuring rotations in the plane of said second optical element.

15. Apparatus for stabilizing an optical line of sight, comprising:
 a first optical element;
 a frame carrying said first optical element;
 second optical element, said second and first optical elements complimentary to one another;
 a carriage carrying said second optical element and capable of movement in a spherical manner relative to said first optical element;
 two or more bearing assemblies securely retaining said carriage and said frame in close spaced relation to one another such that said first and second optical elements are nominally centered about an optical axis and said carriage is moveable in a spherical manner relative to said frame about said optical axis; and
 a motor for moving said second optical element relative to said first optical element in response to small amplitude accelerations, causing light passing through said first and second optical elements to refract and thereby stabilize said line of sight;
 said motor comprising
 a first motor driving means for moving said second optical element back and forth about a first movement axis; and
 a second motor driving means for moving said second optical element back and forth about a second movement axis, said first and second movement axes orthogonal to one another.

16. Apparatus for stabilizing an optical line of sight, comprising:
 a first optical element;
 a frame carrying said first optical element;
 a second optical element, said second and first optical elements complimentary to one another;
 a carriage carrying said second optical element and capable of movement in a spherical manner relative to said first optical element;
 two or more bearing assemblies securely retaining said carriage and said frame in close spaced relation to one another such that said first and second optical elements are nominally centered about an optical axis and said carriage is moveable in a spherical manner relative to said frame about said optical axis; and
 a motor for moving said second optical element relative to said first optical element in response to small amplitude accelerations, causing light passing through said first and second optical elements to refract and thereby stabilize said line of sight;
 said motor comprising
 a first motor driving means for moving said second optical element back and forth about a first movement axis; and
 a second motor driving means for moving said second optical element back and forth about a second movement axis, said first and second movement axes orthogonal to one another;
 and wherein said first and second motor driving means are mounted to said frame.

17. In an optical system having a first fixed optical element mounted in a frame having an interior surface and a second optical element carried by a carriage mounted to said interior surface of said frame and movable in a spherical manner relative to said first optical element, a motor for moving said second optical element relative to a first optical element, the motor comprising:
- a magnet fixed to said carriage, said magnet defining a cylindrical interior recess region;
- a coil nested within said interior recess region;
- a current source electrically connected to said coil; and
- a link coupling said coil to said carriage;
- said coil and link reciprocable relative to said frame, whereby said link moves said carriage relative to said frame when said current flows through said coil.

18. In an optical system having a first fixed optical element mounted in a frame and a second optical element mounted in a carriage and movable relative to said first optical element, a motor for moving said second optical element relative to a first optical element, the motor comprising:
- a magnet fixed to said carriage, said magnet defining a cylindrical interior recess region;
- a coil nested within said interior recess region;
- a current source electrically connected to said coil;
- a link coupling said coil to said carriage;
- said coil and link reciprocable relative to said frame, whereby said link moves said carriage relative to said frame when said current flows through said coil; and
- a hinge structure maintaining said coil in axial alignment with said magnet.

19. The motor of claim 18, wherein said hinge structure comprises four hinges, each of said hinges having a top mounting portion fixed with respect to said coil, a bottom mounting portion fixed with respect to said magnet, and moveable portions moveable about three parallel pivot axes, thereby permitting said coil to move an axial direction relative to said magnet but preventing tilt or rotation of said coil relative to said magnet.

20. The motor of claim 19, wherein each of said hinges have a high aspect ratio of at least 3 to 1.

21. In an optical system comprising an optical device having a line of sight, a first lens carried in a frame and fixed relative to said optical device, and a second lens movable relative to said first lens, said second lens mounted in a carriage, said system further comprising a motor for moving said carriage relative to said frame,
a method for stabilizing said line of sight comprising the steps of:
(a) measuring accelerations in the plane of said second optical element;
(b) measuring the movement of said carriage relative to said frame;
(c) calculating commands for said motor from said measurements of accelerations and measurements of movement;
(d) driving said motor to move said second lens relative to first lens according to said commands, whereby said line of sight is stabilized when angular disturbances are imparted to said optical system.

22. The method of claim 21 wherein said optical device defines a line of sight axis and wherein said step of measuring accelerations comprises the step of measuring linear accelerations along at least one axis substantially parallel to said line of sight axis.

23. In an optical system comprising an optical device having a line of sight, a first lens carried in a frame and fixed relative to said optical device, and a second lens movable relative to said first lens, said second lens mounted in a carriage, said system further comprising a motor for moving said carriage relative to said frame,
a method for stabilizing said line of sight comprising the steps of:
(a) measuring rotations in the plane of said second optical element;
(b) measuring the movement of said carriage relative to said frame;
(c) calculating commands for said motor from said measurements of rotations and measurements of movement;
(d) driving said motor to move said second lens relative to first lens according to said commands, whereby said line of sight is stabilized when angular disturbances are imparted to said optical system.

24. The method of claim 21 or claim 22 wherein said step of driving said motor comprises the step of driving said second lens back and forth about one or two orthogonal movement axes.

25. The method of claim 23, wherein said measuring of rotations comprises the step of measuring the rate of rotation about two orthogonal axes in the plane of said second lens element.

26. The method of claim 25, wherein said orthogonal axes are aligned with the axes of movement of said lens due to the movement of said lens by said motor.

27. A weapon system having an optical system for use with said weapon system, said optical system having a line of sight; the improvement comprising
a line of sight stabilization system mounted to said optical system, said line of sight stabilization system comprising:
- a first optical element;
- a frame carrying said first optical element;
- a second optical element, said second and first optical elements complimentary to one another;
- a carriage carrying said second optical element and capable of movement in a spherical manner relative to said first optical element;
- two or more bearing assemblies securely retaining said carriage and said frame in close spaced relation to one another such that said first and second optical elements are nominally aligned about an optical axis, said optical axis coincident with said line of sight;
- means for measuring the relative movement of said carriage and said frame;
- a motor system responsive to said measuring means for moving said second optical element relative to said first optical element in response to small amplitude disturbances, causing light passing through said first and second optical elements to refract and thereby stabilize said line of sight, said motor system comprising
- a first motor driving means for moving said second optical element back and forth about a first movement axis; and
- a second motor driving means for moving said second optical element back and forth about a second movement axis, said first and second movement axes orthogonal to one another.

28. The weapon system of claim 27, wherein said optical system comprises a guidance system for said weapon system.

29. The weapon system of claim 27, wherein said motor system comprises means for measuring accelerations in the plane of said second optical element.

30. The weapon system of claim 27, wherein said motor system comprises means for measuring rotations in the plane of said second optical element.

31. A weapon system mounted to a vehicle, said weapon system having an optical system for use with said weapon system, said optical system having a line of sight, the improvement comprising:
- a line of sight stabilization system mounted to said optical system, said line of sight stabilization system comprising:
- a first optical element;
- a frame carrying said first optical element;
- a second optical element, said second and first optical elements complimentary to one another;
- a carriage carrying said second optical element and capable of movement in a spherical manner relative to said first optical element;
- two or more bearing assemblies securely retaining said carriage and said frame in close spaced relation to one another such that said first and second optical elements are nominally aligned about an optical axis, said optical axis coincident with said line of sight;
- means for measuring the relative movement of said carriage and said frame;
- a motor system responsive to said measuring means for moving said second optical element relative to said first optical element in response to small amplitude disturbances, causing light passing through said first and second optical elements to refract and thereby stabilize said line of sight, said motor system comprising
- a first motor driving means for moving said second optical element back and forth about a first movement axis; and
- a second motor driving means for moving said second optical element back and forth about a second movement axis, said first and second movement axes orthogonal to one another.

32. A man-portable weapon system, said weapon system having an optical system for use with said weapon system, said optical system having a line of sight, the improvement comprising:
- a line of sight stabilization system mounted to said optical system, said line of sight stabilization system comprising:
- a first optical element;
- a frame carrying said first optical element;
- a second optical element, said second and first optical elements complimentary to one another;
- a carriage carrying said second optical element and capable of movement in a spherical manner relative to said first optical element;
- two or more bearing assemblies securely retaining said carriage and said frame in closed spaced relation to one another such that said first and second optical elements are nominally aligned about an optical axis, said optical axis coincident with said line of sight;
- means for measuring the relative movement of said carriage and said frame;
- a motor system responsive to said measuring means for moving said second optical element relative to said first optical element in response to small amplitude disturbances, causing light passing through said first and second optical elements to refract and thereby stabilize said line of sight,
- said line of sight stabilization system mounted to said optical system such that said optical line of sight and said optical axis defined by said first and second optical elements are nominally aligned.

* * * * *